(12) United States Patent
Clever et al.

(10) Patent No.: US 8,989,928 B2
(45) Date of Patent: Mar. 24, 2015

(54) WATERCRAFT THROTTLE CONTROL SYSTEMS AND METHODS

(75) Inventors: Timothy J. Clever, Waterford, MI (US); Kevin A. Cansiani, St. Clair Shores, MI (US); Ronald E. Gaskins, Kokomo, IN (US); Martin Payne, Spring Lake, MI (US); Christopher A. Koches, Muskegon, MI (US); Lance Norris, Bonney Lake, WA (US)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/165,110

(22) Filed: Jun. 21, 2011

(65) Prior Publication Data

US 2012/0191276 A1  Jul. 26, 2012

Related U.S. Application Data

(60) Provisional application No. 61/434,661, filed on Jan. 20, 2011.

(51) Int. Cl.
| | |
|---|---|
| *B60L 3/00* | (2006.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G06F 19/00* | (2011.01) |
| *G06G 7/00* | (2006.01) |
| *G06G 7/76* | (2006.01) |
| *B63H 21/21* | (2006.01) |
| *F02D 41/24* | (2006.01) |
| *F02D 41/00* | (2006.01) |

(52) U.S. Cl.
CPC ............ *B63H 21/21* (2013.01); *F02D 41/2422* (2013.01); *F02D 41/0002* (2013.01); *F02D 2200/602* (2013.01); *Y02T 10/42* (2013.01)
USPC ..................... 701/21; 701/36; 701/54; 701/70

(58) Field of Classification Search
USPC ................ 701/21, 99, 101, 104, 110, 55, 56; 717/168, 169, 171; 707/758
See application file for complete search history.

(56) References Cited

U.S. PATENT DOCUMENTS

| | | | | |
|---|---|---|---|---|
| 4,691,677 | A | * | 9/1987 | Hotate et al. .................. 123/399 |
| 4,763,264 | A | * | 8/1988 | Okuno et al. .................. 123/399 |

(Continued)

OTHER PUBLICATIONS

Gina Trapani, "How to use MD5 sums to verify downloaded files", Mar. 27, 2007, www.lifehacker.com/247262/how-to-use-md5-sums-to-verify-downloaded-files.*

(Continued)

*Primary Examiner* — Yonel Beaulieu
*Assistant Examiner* — Lail Kleinman

(57) ABSTRACT

A system for a watercraft includes memory, a communications module, and a throttle control module. The memory includes a first mapping of measured accelerator position to desired throttle opening. The communications module selectively downloads a second mapping of the measured accelerator position to the desired throttle opening to the memory. The throttle control module generates the desired throttle opening based on the measured accelerator position and a selected one of the first and second mappings. A throttle actuator module opens a throttle valve based on the desired throttle opening.

15 Claims, 5 Drawing Sheets

(56) References Cited

U.S. PATENT DOCUMENTS

| | | | |
|---|---|---|---|
| 4,919,096 A * | 4/1990 | Manaka et al. | 123/399 |
| 5,074,810 A | 12/1991 | Hobbs et al. | |
| 5,110,310 A | 5/1992 | Hobbs | |
| 5,477,826 A * | 12/1995 | Hara et al. | 123/339.16 |
| 5,700,171 A | 12/1997 | Horton | |
| 5,765,528 A | 6/1998 | Kamimaru | |
| 6,109,986 A | 8/2000 | Gaynor et al. | |
| 6,485,341 B1 | 11/2002 | Lanyi et al. | |
| 6,672,282 B2 | 1/2004 | Harrison et al. | |
| 6,757,606 B1 * | 6/2004 | Gonring | 701/103 |
| 7,214,110 B1 * | 5/2007 | Ehlers et al. | 440/1 |
| 7,361,067 B1 | 4/2008 | Smedema | |
| 7,877,174 B2 | 1/2011 | Walser et al. | |
| 2002/0157639 A1 * | 10/2002 | Kidokoro et al. | 123/396 |
| 2004/0153286 A1 * | 8/2004 | Yamada | 702/183 |
| 2005/0121005 A1 | 6/2005 | Edwards | |
| 2007/0233430 A1 | 10/2007 | Singh | |
| 2008/0028387 A1 * | 1/2008 | Nakagawa et al. | 717/172 |
| 2009/0215331 A1 * | 8/2009 | Suzuki et al. | 440/1 |
| 2009/0229568 A1 * | 9/2009 | Nakagawa | 123/342 |
| 2010/0152990 A1 | 6/2010 | Bjernetun et al. | |
| 2012/0191275 A1 | 7/2012 | Clever et al. | |
| 2012/0191277 A1 | 7/2012 | Clever et al. | |

OTHER PUBLICATIONS

"Simple Digital systems engine map examples"; waybackmachine(http://web.archive.org/web/20001117173300/http://www.sdsefi.com/techmap.htm); posted Nov. 17, 2000; retrieved Aug. 21, 2013 by examiner.

* cited by examiner

WATERCRAFT THROTTLE CONTROL SYSTEMS AND METHODS

CROSS-REFERENCE TO RELATED APPLICATIONS

This application claims the benefit of U.S. Provisional Application No. 61/434,661, filed on Jan. 20, 2011. The disclosure of the above application is incorporated herein by reference in its entirety.

FIELD

The present disclosure relates to internal combustion engines and more particularly to throttle control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine control module controls opening of a throttle valve of an engine. The ECM controls the opening of the throttle valve based on an accelerator position. An accelerator position sensor measures position of an accelerator (e.g., an accelerator arm or lever) and generates the accelerator position based on the position of the accelerator. A driver of the watercraft actuates the accelerator to control the speed of the watercraft.

SUMMARY

A system for a watercraft includes memory, a communications module, and a throttle control module. The memory includes a first mapping of measured accelerator position to desired throttle opening. The communications module selectively downloads a second mapping of the measured accelerator position to the desired throttle opening to the memory. The throttle control module generates the desired throttle opening based on the measured accelerator position and a selected one of the first and second mappings. A throttle actuator module opens a throttle valve based on the desired throttle opening.

A method for a watercraft includes: providing a first module with memory that includes a first mapping of measured accelerator position to desired throttle opening; selectively downloading a second mapping of the measured accelerator position to the desired throttle opening to the memory; generating the desired throttle opening based on the measured accelerator position and a selected one of the first and second mappings; and opening a throttle valve based on the desired throttle opening.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
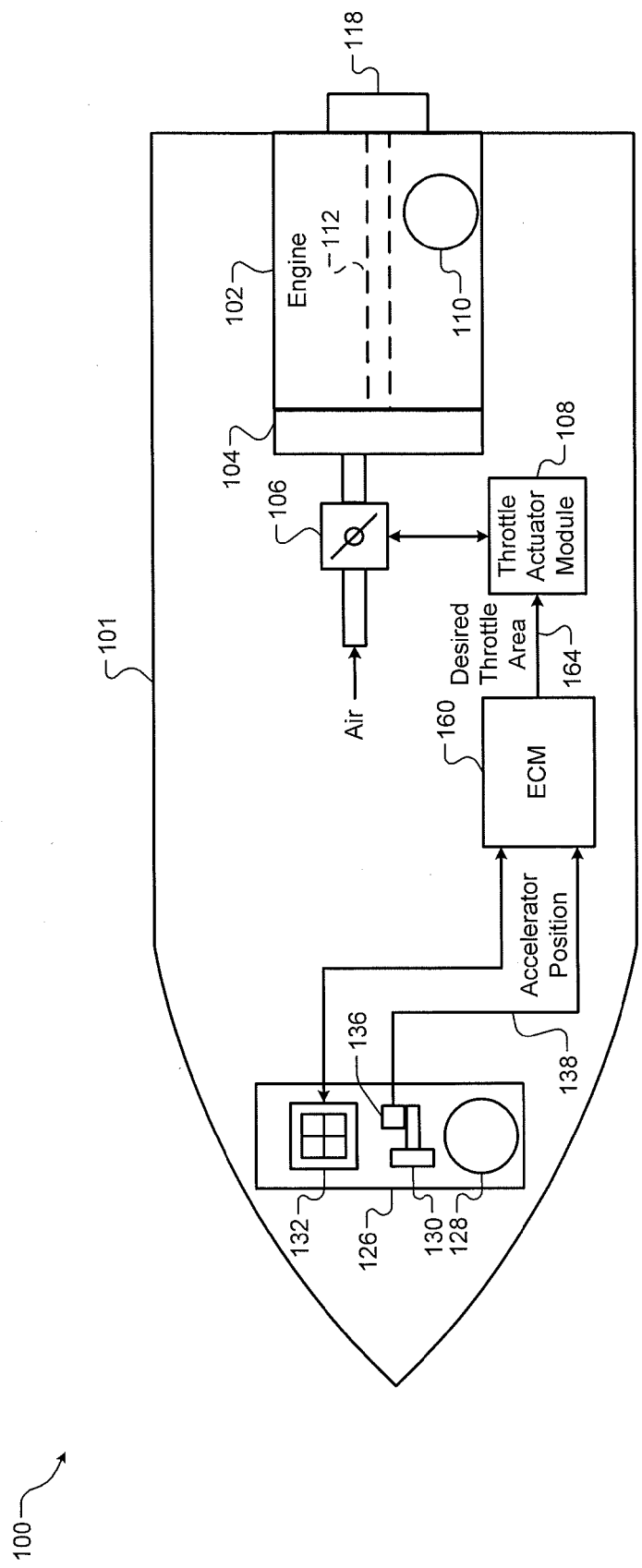
FIG. 1 is a functional block diagram of an example watercraft system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) of a watercraft includes a static throttle control profile that is stored in memory of the ECM. The static throttle control profile includes a mapping of accelerator position to desired throttle area. The ECM receives the accelerator position from an accelerator position sensor and generates the desired throttle area based on the accelerator position using the static throttle control profile. A throttle actuator module, such as an electronic throttle controller, controls opening of a throttle valve based on the desired throttle area.

In some circumstances, a user of the watercraft may want to change relationship between the accelerator position and the desired throttle area from how the relationship is defined by the mapping. For example only, the user may prefer one relationship for docking situations, one relationship for towing situations, etc.

A user interface module includes one or more predetermined mappings of accelerator position to desired throttle area that are stored in a library of the user interface module. The user may select a second mapping from the library using the user interface module and trigger the ECM to download the second mapping. The ECM downloads the second mapping from the user interface module and selectively uses the second mapping in generating the desired throttle area based on the accelerator position.

Referring now to FIG. 1, a functional block diagram of an example watercraft system 100 is presented. While the present disclosure will be discussed in conjunction with a watercraft 101, the present disclosure is also applicable to other types of vehicles, such as automobiles. The watercraft 101 includes an engine 102 that generates torque to propel the watercraft 101. The engine 102 may include, for example only, a spark-ignition internal combustion engine (ICE), a compression-ignition internal combustion engine, or another suitable type of internal combustion engine. The watercraft 101 may also include one or more additional engines.

Air is drawn into the engine 102 through an intake manifold 104. A throttle valve 106 varies airflow into the intake manifold 104 and the engine 102. A throttle actuator module 108 (e.g., an electronic throttle controller or ETC) controls opening of the throttle valve 106. One or more fuel injectors (not shown) selectively inject fuel for combustion within the engine 102. An air/fuel mixture is combusted within cylinders of the engine 102, such as a cylinder 110. Although the engine 102 is depicted as including only the cylinder 110, the engine 102 may include more than one cylinder.

The cylinder 110 includes a piston (not shown) that is mechanically linked to a crankshaft 112. One combustion cycle within the cylinder 110 may include four phases: an intake phase, a compression phase, a combustion (or expansion) phase, and an exhaust phase. During the intake phase, the piston moves toward a bottommost position and draws air into the cylinder 110. During the compression phase, the piston moves toward a topmost position and compresses the contents of the cylinder 110.

During the combustion phase, spark from a spark plug (not shown) ignites the air/fuel mixture. The combustion of the air/fuel mixture drives the piston back toward the bottommost position, and the piston drives rotation of the crankshaft 112. Resulting exhaust gas is expelled from the cylinder 110 through an exhaust manifold to complete the exhaust phase and a combustion cycle of the cylinder 110. A propeller 118 is coupled to and rotates with the crankshaft 112. The propeller 118 imparts momentum to water, which causes a propulsion force to act on the watercraft 101.

A watercraft instrument panel 126 includes a steering wheel 128, an accelerator lever 130, and a user interface module (UIM) 132. An operator of the watercraft 101 manipulates the steering wheel 128 to steer the watercraft 101. The operator manipulates the accelerator lever 130 to control speed of the watercraft 101. An accelerator position sensor 136 monitors the orientation (e.g., position) of the accelerator lever 130 and generates an accelerator position signal 138 based on the orientation of the accelerator lever 130. For example only, the accelerator position signal 138 may indicate a percentage between 0 percent and 100 percent, where the percentage is 0 percent when the accelerator lever 130 is in an idle position and the percentage is 100 percent when the accelerator lever 130 is in a wide open throttle position.

An engine control module (ECM) 160 generates a desired throttle area 164 based on the accelerator position 138. For example only, the desired throttle area 164 may indicate an opening percentage of the throttle valve 106 between 0 percent and 100 percent, where the opening percentage of 0 percent corresponds to the throttle valve 106 being fully closed and the opening percentage of 100 percent corresponds to the throttle valve 106 being fully open.

The ECM 160 generates the desired throttle area 164 further based on an active throttle control profile. The active throttle control profile may include a mapping that relates the accelerator position 138 to the desired throttle area 164. In other words, the active throttle control profile may include a mapping of values of the desired throttle area 164 indexed by values of the accelerator position 138.

The active throttle control profile may be a static throttle control profile stored in memory of the ECM 160 or a throttle control profile selected by a user and downloaded to the ECM 160. A user can select the throttle control profile from a library of one or more predefined throttle control profiles stored in the UIM 132. The user may initiate a download of the selected throttle control profile to the ECM 160 via one or more input devices of the UIM 132. The user may initiate use of the selected throttle control profile as the active throttle control profile via one or more devices of the UIM 132. The ability to download a selected throttle control profile to the ECM 160 for use in generating the desired throttle area 164 allows the user to tailor how the ECM 160 controls the throttle valve 106 based on the user's manipulation of the accelerator lever 130.

Figure 2:
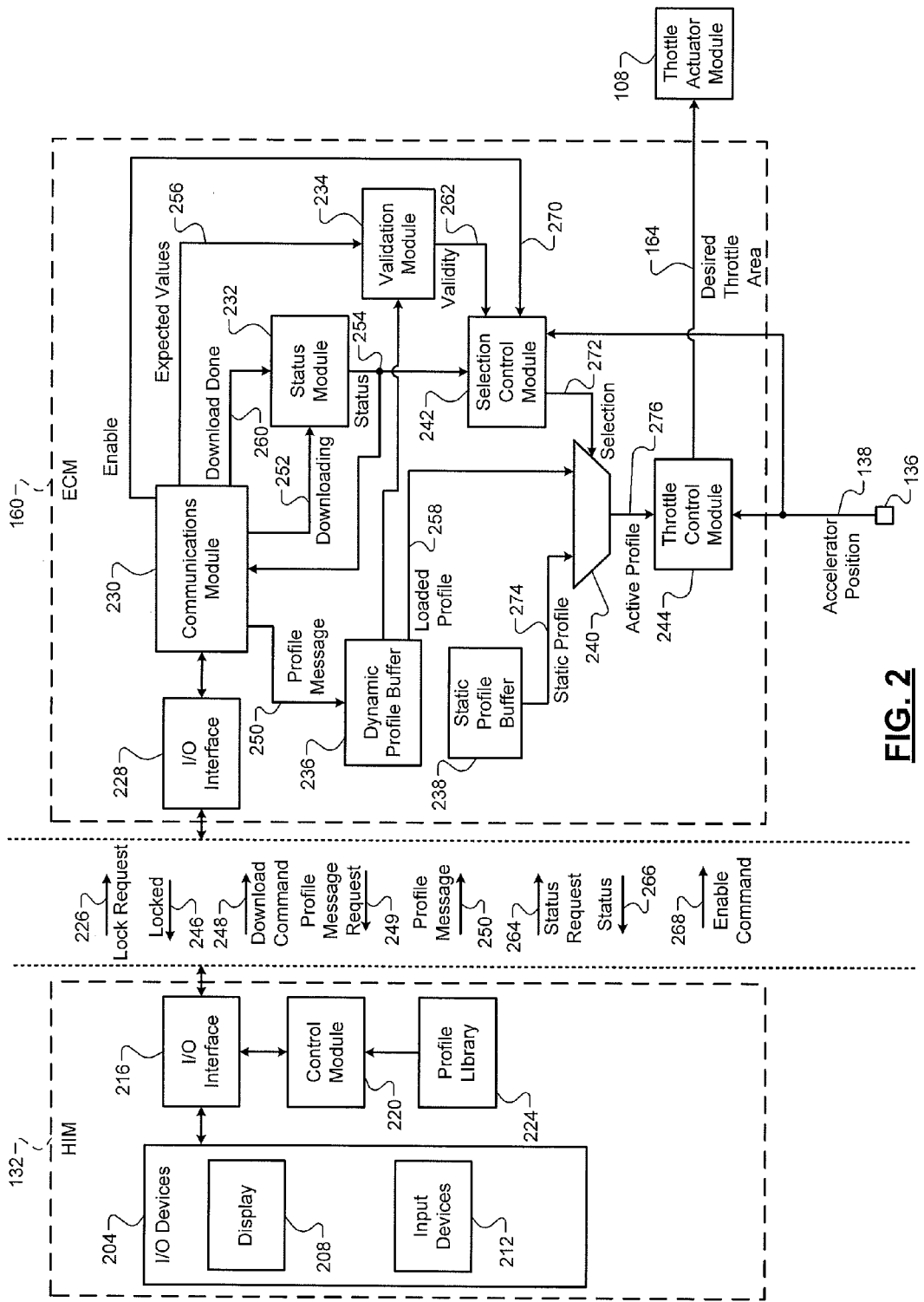
FIG. 2 is a functional block diagram an example watercraft control system according to the present disclosure.

Referring now to FIG. 2, a functional block diagram of an example watercraft control system is presented. The UIM 132 may include one or more input/output (I/O) devices 204, such as a display 208, and one or more input devices 212. For example only, the display 208 may be a touchscreen display. The input devices 212 may include one or more buttons, switches, pointing devices (e.g., a trackball or mouse), and/or one or more other suitable input devices.

Figure 3:
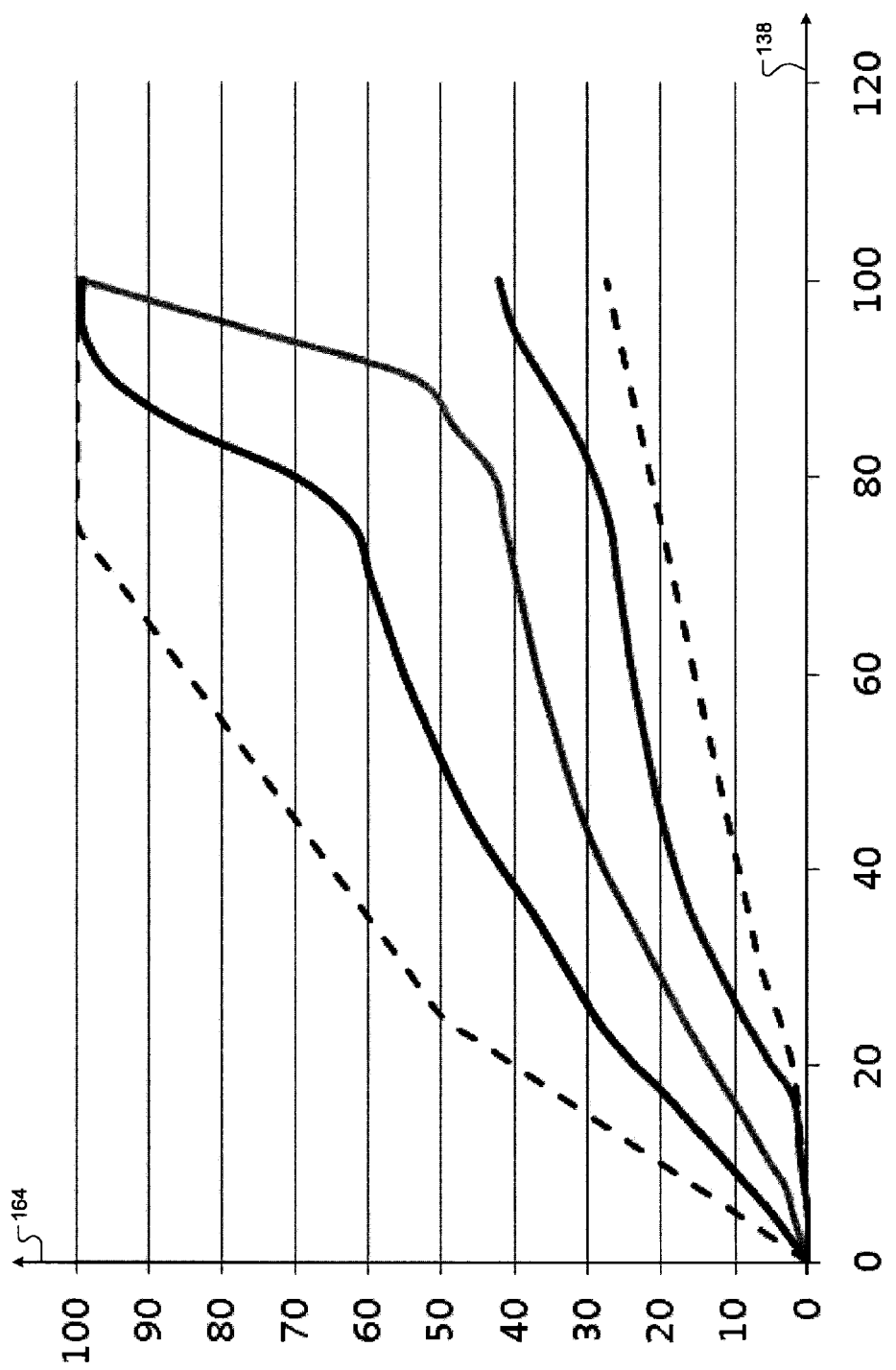
FIG. 3 is an example graph of various throttle control profiles according to the present disclosure.

The UIM 132 also includes an I/O interface 216, a control module 220, and a profile library 224. The profile library 224 includes one or more predetermined throttle control profiles. Each of the throttle control profiles includes a mapping of two or more data points that relate the accelerator position 138 to the desired throttle area 164. Each data point indicates a value of the desired throttle area 164 corresponding to a value of the accelerator position 138. The predetermined throttle control profiles may be, for example, set by a manufacturer, recorded during previous use of the watercraft 101, loaded to the profile library 224 after manufacture, and/or provided in another suitable manner. A plurality of throttle control profiles are illustrated in the example of FIG. 3.

The control module 220 displays profile data on the display 208 for selection of one of the predetermined throttle control profiles by a user of the watercraft 101. For example only, each of the predetermined throttle control profiles includes a profile identifier (ID), and the control module 220 may display the profile ID for each of the predetermined throttle control profiles on the display 208. In various implementations, the control module 220 may display an illustration (e.g., a graphical illustration) of the relationship of accelerator position to desired throttle area for each of the predetermined throttle control profiles.

The user can select one of the predetermined throttle control profiles for use by the ECM 160 in generating the desired throttle area 164 using one or more of the I/O devices 204. The control module 220 transmits a lock request 226 to the ECM 160 when the user selects one of the predetermined throttle control profiles. The UIM 132 outputs data and receives data via the I/O interface 216.

The ECM 160 includes an I/O interface 228, a communications module 230, status module 232, a validation module 234, a dynamic profile buffer 236, a static profile buffer 238, a selector module 240, a selection control module 242, and a throttle control module 244. The ECM 160 outputs data and receives data via the I/O interface 228.

When the lock request 226 is received from the UIM 132, the communications module 230 denies write access to the dynamic profile buffer 236 to modules other than the UIM 132 (i.e., to modules other than the sender of the request). The communications module 230 selectively transmits a locked signal 246 back to the UIM 132 when the lock request 226 is received.

The control module 220 transmits a download command 248 to the ECM 160 when the locked signal 246 is received. The download command 248 includes the profile ID of the selected throttle control profile and the number of data points in the selected throttle control profile. If the ECM 160 accepts the download command 248 (e.g., when the dynamic profile buffer 236 is locked, the number of data points is valid, etc.), the ECM 160 generates a profile request message 249 which requests that the control module 220 transmit the selected throttle control profile. The control module 220 then transmits a profile message 250 for the selected throttle control profile to the ECM 160. The profile message 250 includes the profile ID of the selected throttle control profile, the number of data points in the selected throttle control profile, a checksum value of the selected throttle control profile, and the data points of the selected throttle control profile. The profile message 250 may also include other data for the selected throttle control profile, such as how to calculate a checksum value for the selected throttle control profile.

When the download command 248 is received, the communications module 230 generates a downloading signal 252. The status module 232 generates a status 254 for using a selected throttle control profile based on one or more parameters. For example only, the status 254 at a given time may be one of disabled, downloading, loading, and enabled. The status module 232 may set the status 254 to disabled by default. The status module 232 may set the status 254 to downloading when the downloading signal 252 is generated. The control module 220 can request that the ECM 160 report the status 254 at any time using a status request 264, which is discussed further below. When the status request 264 is receives, the ECM 160 communicates the status 254 to the control module 220 via a status signal 266.

When the download command 248 is received, the communications module 230 provides expected values 256 of the profile ID and the number of data points of the selected throttle control profile to the validation module 234. The communications module 230 may set the expected value of the profile ID and the expected number of data points to the profile ID and the number of data points indicated in the download command 248. Once the profile message 250 has been downloaded to the dynamic profile buffer 236, the validation module 234 may use the expected values 256 in determining whether the selected throttle control profile is valid and acceptable for use.

The communications module 230 stores the profile message 250 in the dynamic profile buffer 236. In this manner, the profile ID of the selected throttle control profile, the checksum value of the selected throttle control profile, and the data points of the selected throttle control profile are stored in the dynamic profile buffer 236. Other suitable data associated with the selected throttle control profile may also be stored in the dynamic profile buffer 236. The stored data points define a loaded throttle control profile 258 of accelerator position to desired throttle area.

The communications module 230 generates a download done signal 260 when the profile message 250 has been stored in the dynamic profile buffer 236. The status module 232 sets the status 254 to loading when the download done signal 260 is generated.

When the status 254 is loading, the validation module 234 performs one or more validation and testing operations. For example only, the validation module 234 compares the expected profile ID and the expected number of data points with the profile ID and the number of data points stored in the dynamic profile buffer 236, respectively. The validation module 234 may additionally or alternatively determine a checksum value based on data stored in the dynamic profile buffer 236 and compare the checksum value with the checksum value stored in the dynamic profile buffer 236. The validation module 234 may additionally or alternatively determine whether the number of data points stored in the dynamic profile buffer 236 is within a predetermined range. For example only, the predetermined range may be between 2 and 25 points, inclusive, or another suitable range. The validation module 234 may additionally or alternatively determine whether one or more of the stored data points would cause the desired throttle area 164 to decrease with an increase in the accelerator position 138. The validation module 234 may additionally or alternatively determine whether one or more of the data points would cause the desired throttle area 164 to be greater than the accelerator position 138 for a given value of the accelerator position 138. The validation module 234 may additionally or alternatively determine whether the slope of the loaded throttle control profile 258 is always less than a predetermined maximum slope.

The validation module 234 generates a validity signal 262 based on the validation and testing operations. The validity signal 262 indicates whether the loaded throttle control profile 258 is valid and acceptable for use by the throttle control module 244. For example only, the validation module 234 may set the validity signal 262 to an active state when the loaded throttle control profile 258 is valid and acceptable for use. The validation module 234 may set the validity signal 262 to an inactive state when the loaded throttle control profile 258 is invalid and/or unacceptable for use.

For example only, the validation module 234 may indicate that the loaded throttle control profile 258 is valid and acceptable for use when the following conditions are satisfied:

(1) the expected ID is the same as the stored profile ID;
(2) the expected number of data points is the same as the stored number of data points;
(3) the checksum value determined based on the stored data is the same as the stored checksum value;
(4) none of the stored data points would cause the desired throttle area 164 to decrease with an increase in the accelerator position 138;
(5) none of the data points would cause the desired throttle area 164 to be greater than the accelerator position 138 for a given value of the accelerator position 138; and
(6) the slope of the loaded throttle control profile 258 is always less than the predetermined maximum slope.

The validation module 234 may indicate that the loaded throttle control profile 258 is invalid and/or unacceptable for use when one or more of the conditions are not satisfied.

The control module 220 may selectively transmit the status request 264 to the ECM 160. The communications module 230 transmits the status signal 266 to the UIM 132 in response to the status request 264. The status signal 266 indicates the status 254. The status signal 266 may also include other data, such as whether one or more errors have been detected by the ECM 160, the profile ID stored in the dynamic profile buffer 236, and/or other suitable data.

When the status signal 266 indicates that the status 254 is loading, the control module 220 may prompt the user for verification. The control module 220 may display the profile ID indicated in the status signal 266 and display a predetermined message requesting that the user provide a predetermined input to verify the use of the displayed profile ID.

The control module 220 transmits an enable command 268 when the user provides the predetermined input. The communications module 230 generates an enable signal 270 when the enable command 268 is received. The selection control module 242 generates a selection signal 272 and outputs the selection signal 272 to the selector module 240. The selector module 240 receives the loaded throttle control profile 258, a static throttle control profile 274, and the selection signal 272. The static throttle control profile 274 is stored within the ECM 160 in the static profile buffer 238. Like the loaded throttle control profile 258, the static throttle control profile 274 includes two or more data points defining a mapping of accelerator position to desired throttle area. However, the static profile buffer 238, and therefore the static throttle control profile 274, may be non-rewritable.

The selector module 240 selects one of loaded throttle control profile 258 and the static throttle control profile 274 as an active throttle control profile 276 based on the selection signal 272. For example only, the selector module 240 may select the static throttle control profile 274 when the selection signal 272 is in an inactive state, and the selector module 240 may select the loaded throttle control profile 258 when the selection signal 272 is in an active state. When the enable signal 270 is received, the selection control module 242 sets the state of the selection signal 272 based on the status 254, the validity signal 262, and the accelerator position 138. For example only, the selection control module 242 may set the selection signal 272 to the active state when the following conditions are satisfied:

(1) the enable signal 270 received;
(2) the validity signal 262 is in the active state;
(3) the status 254 is loading; and
(4) the accelerator position 138 is a predetermined idle position.

In various implementations, another suitable indicator of whether the engine 102 is idling, such as engine speed, may be used in addition to or as an alternative to condition (4) being satisfied. If one or more of the conditions are not satisfied, the selection control module 242 may set the selection signal 272 to the inactive state.

The active throttle control profile 276 is provided to the throttle control module 244. The throttle control module 244 determines the desired throttle area 164 based on the accelerator position 138 and the active throttle control profile 276. If the accelerator position 138 is between two accelerator positions in the active throttle control profile 276, the throttle control module 244 may determine the desired throttle area 164 by interpolating between the two desired throttle areas corresponding to the two accelerator positions.

The throttle actuator module 108 controls opening of the throttle valve 106 based on the desired throttle area 164. For example only, the throttle valve 106 may be controlled using pulse width modulation (PWM), and the throttle actuator module 108 may determine and apply a PWM signal to the throttle valve 106 based on the desired throttle area 164.

Figure 4:
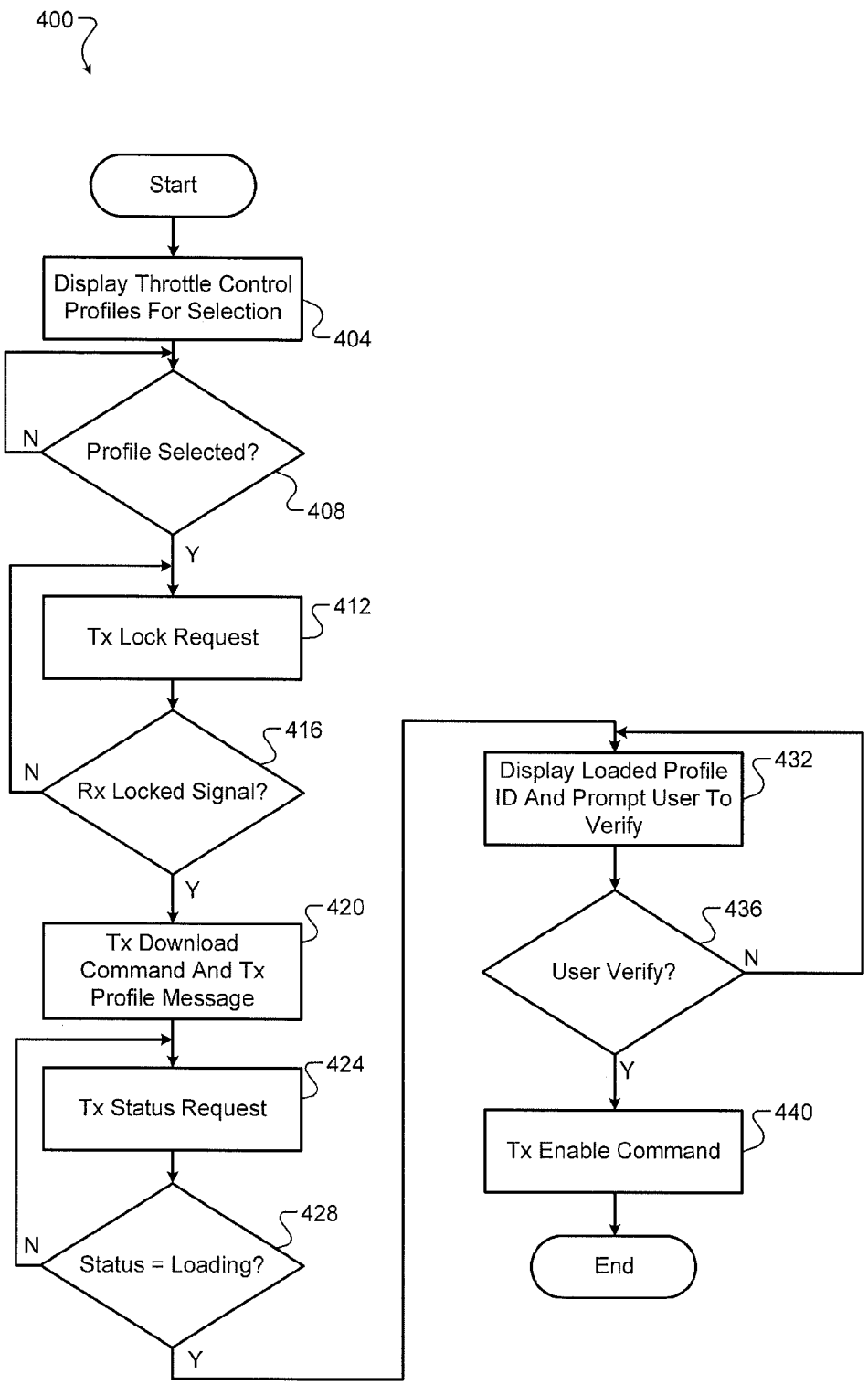
FIG. 4 is a flowchart depicting an example method of operating a user interface module according to the present disclosure.

Referring now to FIG. 4, a flowchart depicting an example method 400 performed by the UIM 132 is presented. Control may begin with 404 where control displays the predetermined throttle control profiles stored in the profile library 224 for selection by a user of the watercraft 101. Control determines whether one of the predetermined throttle control profiles has been selected at 408. If true, control may transmit (Tx) the lock request 226 to the ECM 160 at 412 and continue with 416; if false, control may remain at 408.

At 416, control determines whether the locked signal 246 has been received (Rx). If true, control may continue with 420; if false, control may return to 412. Control may transmit the download command 248 to the ECM 160 and the profile message 250 to the ECM 160 at 420. Control may transmit the status request 264 to the ECM 160 at 424.

Control may determine whether the status signal 266 received from the ECM 160 indicates that the status 254 is loading at 428. If true, control may proceed with 432; if false, control may return to 424. At 432, control displays the profile ID indicated by the status signal 266 and prompts the user to verify that the throttle control profile associated with the profile ID should be used in determining the desired throttle area 164. Control determines whether the user has input the verification at 436. If true, control transmits the enable command 268 to the ECM 160 at 440. Control may end.

Figure 5:
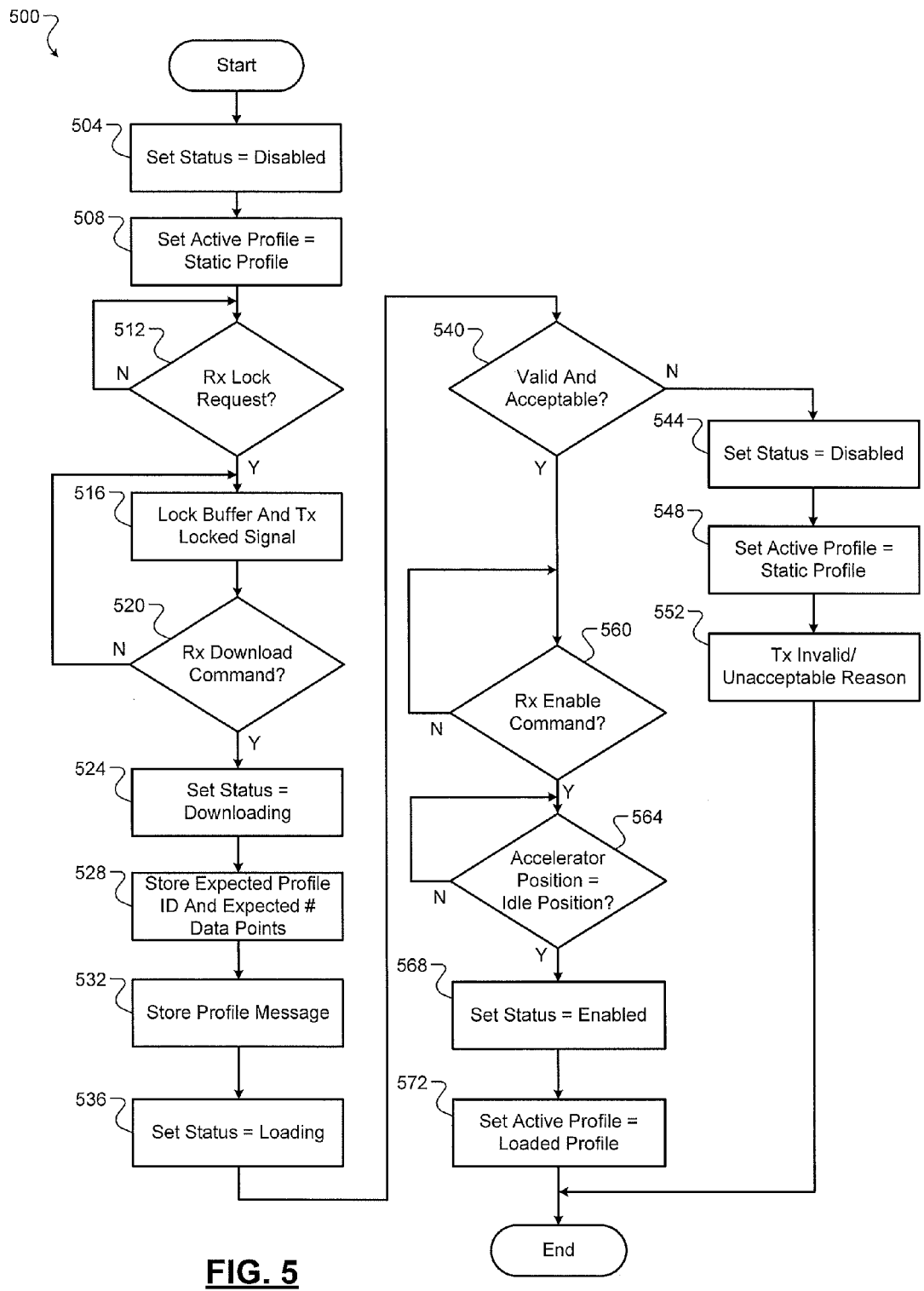
FIG. 5 is a flowchart depicting an example method of operating an engine control module according to the present disclosure.

Referring now to FIG. 5, a flowchart depicting an example method 500 performed by the ECM 160 is presented. Control may begin with 504 where control sets the status 254 to disabled. Control sets the active throttle control profile 276 to the static throttle control profile 274 at 508. The static throttle control profile 274 is stored within the ECM 160.

At 512, control determines whether the lock request 226 has been received (Rx). If true, control continues with 516; if false, control may remain at 512. Control locks the dynamic profile buffer 236 at 516 and transmits (Tx) the locked signal 246 to the UIM 132 at 516. At 520, control determines whether the download command 248 has been received. If true, control sets the status 254 to downloading at 524 and continues with 528. If false, control may return to 516.

Control may store the profile ID and the number of data points indicated by the download command 248 as expected values at 528. Control stores the profile message 250 in the dynamic profile buffer 236. The profile message 250 includes a profile ID for a selected throttle control profile, a checksum value for the selected throttle control profile, and the data points that define the selected throttle control profile. Once stored, the selected throttle control profile is referred to as the loaded throttle control profile 258. Control sets the status 254 to loading at 536.

At 540, control determines whether the loaded throttle control profile 258 is valid and acceptable for use in determining the desired throttle area 164. If true, control may proceed with 560, which is discussed further below. If false, control may continue with 544. Control sets the status 254 to disabled at 544, selects the static throttle control profile 274 as the active throttle control profile 276 at 548. Control may also transmit the reason that the loaded throttle control profile 258 is unacceptable and/or invalid to the UIM 132 at 552. Control may then end.

Referring back to 560 (when the loaded throttle control profile 258 is valid and acceptable), control may determine whether the enable command 268 has been received. If true, control may continue with 564; if false, control may remain at 560. At 564, control determines whether the accelerator position 138 is equal to the predetermined idle accelerator position. If true, control may continue with 568; if false, control may remain at 564. Control may set the status 254 to enabled at 568, control selects the loaded throttle control profile 258 as the active throttle control profile 276 at 572. When the loaded throttle control profile 258 is selected as the active throttle control profile 276, control generates the desired throttle area 164 based on the accelerator position 138 using the relationship between accelerator position and desired throttle position defined by the loaded throttle control profile 258.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a watercraft, comprising:
   memory that includes a first mapping of measured accelerator position to desired throttle opening;
   a first electronic circuit that selectively downloads a second mapping of the measured accelerator position to the desired throttle opening to the memory;
   a second electronic circuit that compares an actual number of data points in the second mapping with a predetermined number of data points for the second mapping, each of the data points relating a measured accelerator position to a desired throttle opening;
   a third electronic circuit that selects one of the first and second mappings, wherein the third electronic circuit selects the second mapping when the measured accelerator position is equal to a predetermined engine idling position and the predetermined and actual numbers are equal; and
   a fourth electronic circuit that generates the desired throttle opening based on the measured accelerator position and the selected one of the first and second mappings,
   wherein a fifth electronic circuit opens a throttle valve based on the desired throttle opening.

2. The system of claim 1 wherein the third electronic circuit selects the first mapping when the accelerator position is greater than the predetermined engine idling position.

3. The system of claim 1 wherein the second electronic circuit further compares a predetermined identifier of the second mapping with a second identifier of the second mapping stored with the second mapping in the memory, and
   wherein the third electronic circuit selectively selects the second mapping when the predetermined identifier and the second identifier are equal.

4. The system of claim 1 wherein the third electronic circuit selectively selects the second mapping when the actual number of data points is within a predetermined range.

5. The system of claim 1 wherein the second electronic circuit further compares a slope of the second mapping with a predetermined maximum slope,
   wherein the third electronic circuit selectively selects the second mapping when the slope is less than the predetermined maximum slope.

6. The system of claim 1 wherein the second electronic circuit further calculates a first checksum value based on the second mapping,
   wherein the third electronic circuit selectively selects the second mapping based on a comparison of the first checksum value and a second checksum value for the second mapping stored in the memory.

7. The system of claim 1 further comprising a sixth electronic circuit that selectively sets a selection signal to a first state when a user verifies use of the second mapping,
   wherein the third electronic circuit selects the second mapping when the selection signal is in the first state.

8. A method for a watercraft, comprising:
   providing a first module with memory that includes a first mapping of measured accelerator position to desired throttle opening;
   selectively downloading a second mapping of the measured accelerator position to the desired throttle opening to the memory;
   comparing an actual number of data points in the second mapping with a predetermined number of data points for the second mapping, each of the data points relating a measured accelerator position to a desired throttle opening;
   selecting one of the first and second mappings, the selecting including selecting the second mapping when the measured accelerator position is equal to a predetermined engine idling position and the predetermined and actual numbers are equal;
   generating the desired throttle opening based on the measured accelerator position and the selected one of the first and second mappings; and
   opening a throttle valve based on the desired throttle opening.

9. The method of claim 8 further comprising selecting the first mapping when the accelerator position is greater than the predetermined engine idling position.

10. The method of claim 8 further comprising:
    comparing a predetermined identifier of the second mapping with a second identifier of the second mapping stored with the second mapping in the memory; and
    selectively selecting the second mapping when the predetermined identifier and the second identifier are equal.

11. The method of claim 8 further comprising selectively selecting the second mapping when the actual number of data points is within a predetermined range.

12. The method of claim 8 further comprising:
    comparing a slope of the second mapping with a predetermined maximum slope; and
    selectively selecting the second mapping when the slope is less than the predetermined maximum slope.

13. The method of claim 8 further comprising:
    calculating a first checksum value based on the second mapping; and
    selectively selecting the second mapping based on a comparison of the first checksum value and a second checksum value for the second mapping stored in the memory.

14. The method of claim 8 further comprising:
    selectively setting a selection signal to a first state when a user verifies use of the second mapping; and
    selecting the second mapping when the selection signal is in the first state.

15. The system of claim 1 wherein the first, second, third, fourth, and fifth electronic circuits include at least one of an Application Specific Integrated Circuit (ASIC), a field programmable gate array (FPGA), a processor, and a combinational logic circuit.

* * * * *